(12) United States Patent
Baek et al.

(10) Patent No.: US 11,920,959 B2
(45) Date of Patent: Mar. 5, 2024

(54) DISPLACEMENT SENSOR HAVING A COIL STRUCTURE, A SHIELD MEMBER AND A HOUSING

(71) Applicant: LG ELECTRONICS INC., Seoul (KR)

(72) Inventors: Seongki Baek, Seoul (KR); Kiwook Lee, Seoul (KR); Sena Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 17/213,535

(22) Filed: Mar. 26, 2021

(65) Prior Publication Data

US 2021/0310829 A1 Oct. 7, 2021

(30) Foreign Application Priority Data

Apr. 2, 2020 (KR) .................. 10-2020-0040357

(51) Int. Cl.
*G01D 5/20* (2006.01)
*H01F 27/02* (2006.01)
*H01F 27/28* (2006.01)

(52) U.S. Cl.
CPC .......... *G01D 5/2086* (2013.01); *H01F 27/02* (2013.01); *H01F 27/288* (2013.01)

(58) Field of Classification Search
CPC .. G01D 5/12; G01D 5/14; G01D 5/20; G01D 5/204; G01D 5/2086; G01D 11/24;

(Continued)

(56) References Cited

U.S. PATENT DOCUMENTS 4,816,759 A * 3/1989 Ames ............... G01D 5/243
324/207.17
7,015,691 B2 * 3/2006 Kang ............... G01R 33/045
324/249

(Continued)

FOREIGN PATENT DOCUMENTS

CN 101000230 7/2007
CN 201229216 4/2009

(Continued)

OTHER PUBLICATIONS

Chinese Office Action dated Dec. 28, 2022 issued in Application No. 202110358037.1.

(Continued)

*Primary Examiner* — Huy Q Phan
*Assistant Examiner* — David B Frederiksen
(74) *Attorney, Agent, or Firm* — KED & Associates LLP

(57) ABSTRACT

The present disclosure relates to a displacement sensor. A displacement sensor according to the embodiment of the present disclosure includes a coil structure consisting of wound coil, a shield member formed to surround an outer periphery of the coil structure and a housing, wherein the housing comprises an upper side wall part surrounding an outer periphery of the shield member and a lower side wall part formed to extend from the upper side wall part, wherein an inner circumferential surface of the lower side wall part is protruded toward the inside of the housing more than an inner circumferential surface of the upper side wall part, wherein an outer circumferential surface of the lower side wall part may include a depressed region formed to be depressed into the inside of the housing by a predetermined depth.

20 Claims, 16 Drawing Sheets

(58) Field of Classification Search
CPC ......... G01D 11/245; H01F 5/00; H01F 27/00; H01F 27/02; H01F 27/28; H01F 27/288
See application file for complete search history.

(56) References Cited

U.S. PATENT DOCUMENTS

| | | | | |
|---|---|---|---|---|
| 2014/0035564 | A1* | 2/2014 | Lee | G01B 7/14 324/207.12 |
| 2015/0301084 | A1* | 10/2015 | Elliott | G01D 5/20 324/207.2 |
| 2015/0332851 | A1* | 11/2015 | Schillinger | H01F 41/098 29/605 |
| 2016/0372960 | A1* | 12/2016 | Ritter | H02J 7/00304 |
| 2017/0290208 | A1* | 10/2017 | Park | H05K 5/03 |

FOREIGN PATENT DOCUMENTS

| | | | |
|---|---|---|---|
| CN | 201302455 | | 9/2009 |
| CN | 201302455 Y | * | 9/2009 |
| CN | 201740537 | | 2/2011 |
| CN | 201740537 U | * | 2/2011 |
| CN | 102869897 | | 1/2013 |
| CN | 105652066 | | 6/2016 |
| CN | 106500580 | | 3/2017 |
| CN | 206223419 | | 6/2017 |
| CN | 109612380 | | 4/2019 |
| CN | 109916285 | | 6/2019 |
| CN | 110646023 | | 1/2020 |
| IE | 922617 | | 2/1993 |
| KR | 10-1084477 | | 11/2011 |
| KR | 30-0753105 | | 7/2014 |

OTHER PUBLICATIONS

Chinese Notice of Allowance dated Dec. 1, 2023 issued in Chinese Application No. 202110358037.1.

* cited by examiner

<1001>

<1002>

DISPLACEMENT SENSOR HAVING A COIL STRUCTURE, A SHIELD MEMBER AND A HOUSING

CROSS-REFERENCE TO RELATED APPLICATION

This application claims the priority benefit of Korean Patent Application No. 10-2020-0040357, filed on Apr. 2, 2020 in the Korean Intellectual Property Office, the disclosure of which is incorporated herein by reference.

BACKGROUND OF THE INVENTION

1. Field of the Invention

The present disclosure relates to a displacement sensor, and more particularly, to a displacement sensor that allows easy position adjustment in the product.

2. Description of the Related Art

The non-contact displacement sensor is a sensor that detects the position of an object spaced apart therefrom. The non-contact displacement sensor is generally referred to as a gap sensor. A general gap sensor may generate a magnetic field around a coil through a high-frequency current flowing through a coil of a probe and detect a distance between the coil and the object based on an eddy current generated by an object located in the magnetic field.

These gap sensors are used for various purposes in products in various industrial fields. The gap sensor may be disposed in the chiller system, as in Prior Document 1 (KR 10-1084477, 2011.11.10). Here, the chiller system supplies cold water to a cold water consumer. The chiller system is characterized in that cold water is cooled by heat exchange between a refrigerant circulating in a refrigeration system and cold water circulating between a cold water consumer and the refrigeration system. The chiller system is a large-capacity facility and can be installed in a large building or the like.

When a gap sensor is disposed in the chiller system, the gap sensor may be disposed to sense the distance to the axis of rotation that rotates the impeller of the compressor. In addition, the chiller system may determine the possibility of the abnormal vibration or the surge may occur by determining the position of the rotational shaft based on the sensed value of the gap sensor.

Meanwhile, as in Prior Document 2 (KR 30-0753105, 2014.07.14), in a general gap sensor, a coil is located on at least one of the upper and lower surfaces of the sensing module, and the terminal connected to the coil is electrically connected to the PCB (Printed Circuit Board). The general gap sensor is constructed by coupling a sensing module to a PCB.

But when the gap sensor includes the coil structure, it is difficult to uniformly form the coils formed on the upper and lower surfaces of the sensing module for each sensor, and the winding interval of each coil is not constant, so the impedance of the coil may not be constant. In addition, as the size of the terminal connected to both ends of the coil is limited, there is a problem in that the physical connection between the terminal and the PCB is broken easily. As the gap sensor is configured through the physical coupling of the sensing module and the PCB, there is inevitably a space limitation for the gap sensor to be placed in the product. For the gap sensor to be disposed close to a rotational shaft, which is a sensing target, there is a problem that a space for disposing the gap sensor must be sufficiently secured.

In addition, in conventional products, since the gap sensor placement space is formed in the product to be corresponded to the size and shape of the gap sensor, it is difficult to finely adjust the position of the gap sensor after the gap sensor is disposed in the placement space within the product.

SUMMARY OF THE INVENTION

The present disclosure aims to solve the above and other problems.

Also, the present disclosure is to provide a displacement sensor having a constant impedance of a coil structure composed of a plurality of coils.

Also, the present disclosure is to provide a displacement sensor having a rigid physical connection between a coil structure and a control circuit.

Also, the present disclosure is to provide a displacement sensor in which the position of a gap sensor disposed in a product can be easily adjusted.

The problems of the present disclosure are not limited to the problems mentioned above, and other problems that are not mentioned will be clearly understood by those who skilled in the art with the following description.

To achieve the above objects, a displacement sensor according to the embodiment of the present disclosure includes a coil structure consisting of wound coil, a shield member formed to surround an outer periphery of the coil structure and a housing, wherein the housing may include an upper side wall part surrounding an outer periphery of the shield member and a lower side wall part formed to extend from the upper side wall part, wherein an inner circumferential surface of the lower side wall part is protruded toward the inside of the housing more than an inner circumferential surface of the upper side wall part, wherein an outer circumferential surface of the lower side wall part includes a depressed region formed to be depressed into the inside of the housing by a predetermined depth.

Details of other embodiments are included in the detailed description and drawings.

DETAILED DESCRIPTION OF THE PREFERRED EMBODIMENTS

Figure 1A:
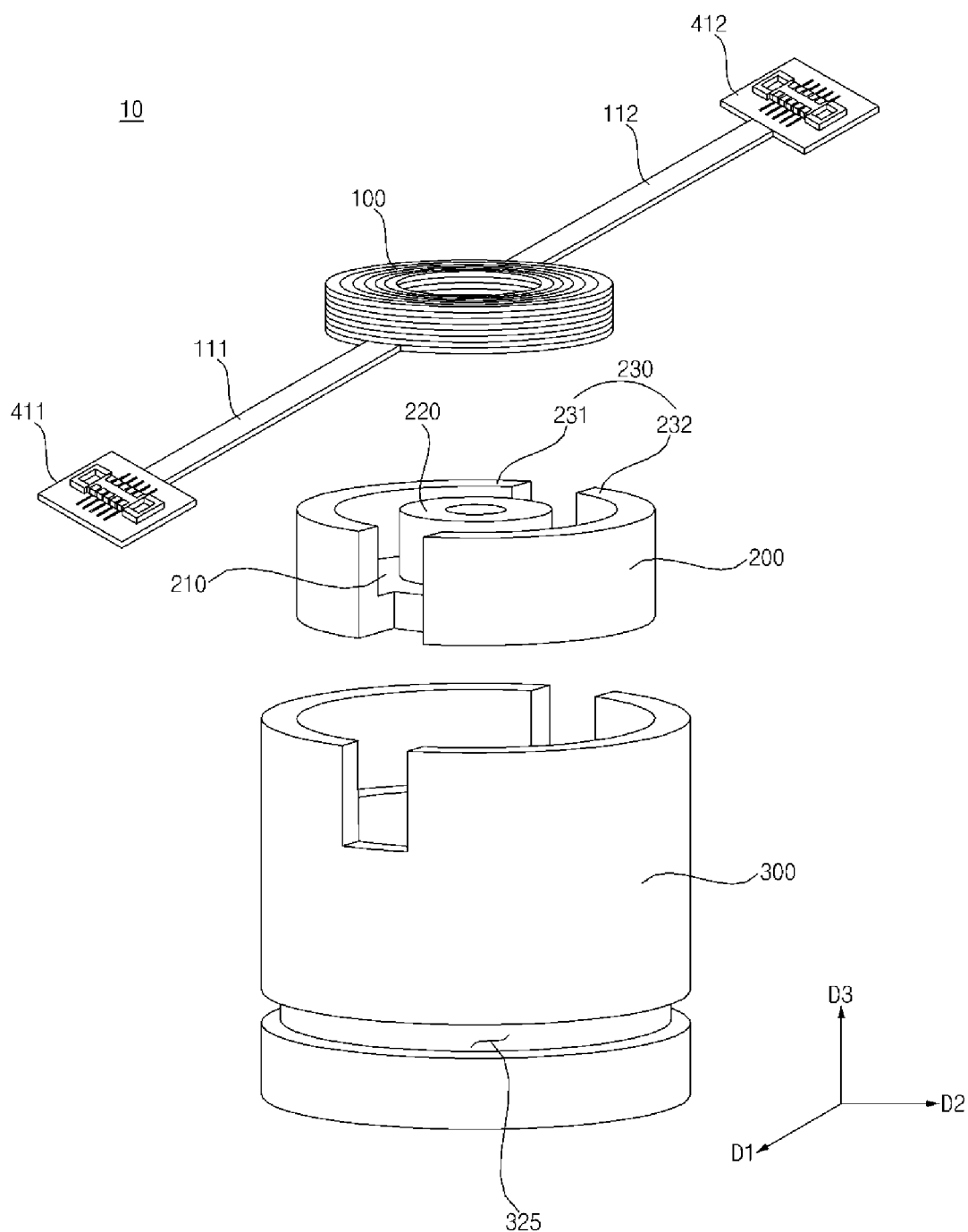
FIG. 1A is an exploded perspective view of a displacement sensor according to an embodiment of the present disclosure.

Advantages and features of the present disclosure, and a method of achieving them will become apparent with reference to the embodiments described below in detail together with the accompanying drawings. However, the present disclosure is not limited to the embodiments disclosed below but may be implemented in a variety of different forms. The present embodiments are provided to disclose completely the present disclosure and to fully inform the scope of the present disclosure to those who skilled in the art to which the present disclosure pertains. The disclosure is only defined by the scope of the claims. The same reference sign refers to the same elements throughout the whole specification.

Spatially relative terms "below", "beneath", "lower", "above", "upper", etc. can be used to easily describe the correlation between the component and other component, as shown in the figures. Spatially relative terms should be understood as terms including different directions of components during use or operation in addition to the directions shown in the drawings. For example, if a component shown in a drawing is turned over, a component described as "below" or "beneath" of another component will be placed "above" the other component. Accordingly, the exemplary term "below" may include both directions below and above. Components may be oriented in other directions, and thus spatially relative terms may be interpreted according to the orientation.

The terms used in the present specification are for describing exemplary embodiments and are not intended to limit the present disclosure. In this specification, the singular form also includes the plural form unless specifically stated in the phrase. "comprises" and/or "comprising" used in the specification do not exclude the presence or addition of one or more other components, steps and/or actions to the stated components, steps and/or actions.

Unless otherwise defined, all terms (including technical and scientific terms) used in the present specification may be used as meanings that can be commonly understood by those who skilled in the art to which the present disclosure belongs. In addition, terms defined in commonly used dictionaries are not interpreted ideally or excessively unless explicitly defined specifically.

In the drawings, the thickness or size of each component is exaggerated, omitted, or schematically illustrated for convenience and clarity of description. Also, the size and area of each component do not fully reflect the actual size or area.

The suffixes "module" and "unit" used for components in the following description are given or used interchangeably in consideration of only the ease of preparation of the specification, and do not have a distinct meaning or role to each other.

In addition, in the present specification, terms such as first and second may be used to describe various elements, but these elements are not limited by these terms. These terms are only used to distinguish one element from another.

Figure 1B:
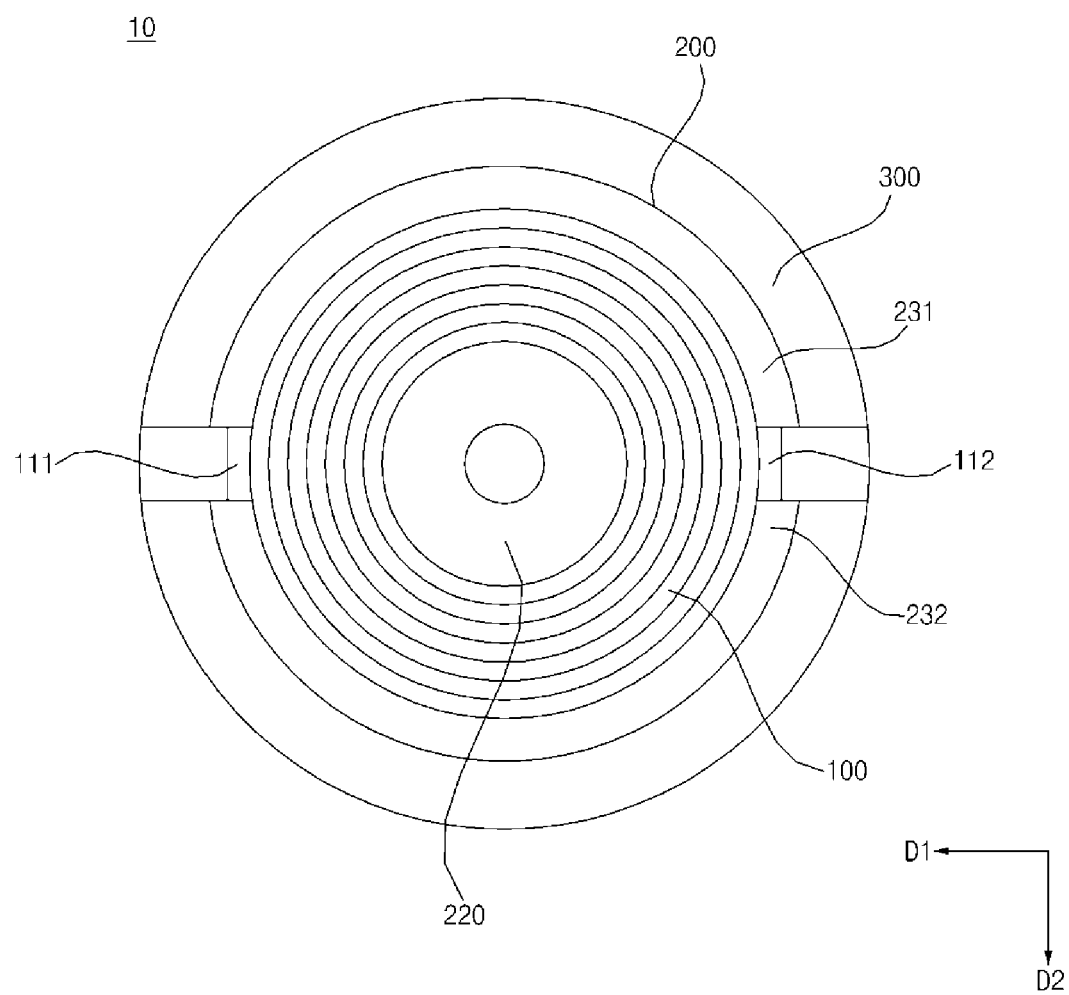
FIG. 1B is a plane view in a state in which the components included in the displacement sensor of FIG. 1A are combined.

FIG. 1A is an exploded perspective view of a displacement sensor according to an embodiment of the present disclosure. FIG. 1B is a plane view in a state in which the components included in the displacement sensor of FIG. 1A are combined.

Referring to the FIG. 1A and FIG. 1B, the displacement sensor 10 may include a coil structure 100, a shield member 200, and/or housing 300. The displacement sensor 10 may include further a connector 411, 412 electrically connected to the coil structure 100.

The coil structure 100 may be provided as a wound coil. For example, the coil structure 100 may be formed by overlapping a plurality of coils (e.g., 101 to 109 of FIG. 9) electrically connected to each other. In the present drawing, the shape of the wound coil of the coil structure 100 is shown in a circular shape, but it is not limited thereto. The shape of the wound coil of the coil structure 100 may be formed in a polygonal shape such as a triangle or a square.

The coil structure 100 may be electrically connected to the connectors 411, 412 through conductors 111, 112. For example, a coil disposed at the lowermost end of the coil structure 100 and the first connector 411 may be connected by the first conductor 111, and a coil disposed at the top of the coil structure 100 and a second connector 412 may be connected by the second conductor 112.

The shield member 200 may be formed to surround the outer periphery of the coil structure 100. The structure of the shield member 200 will be described with FIG. 2.

Figure 2:
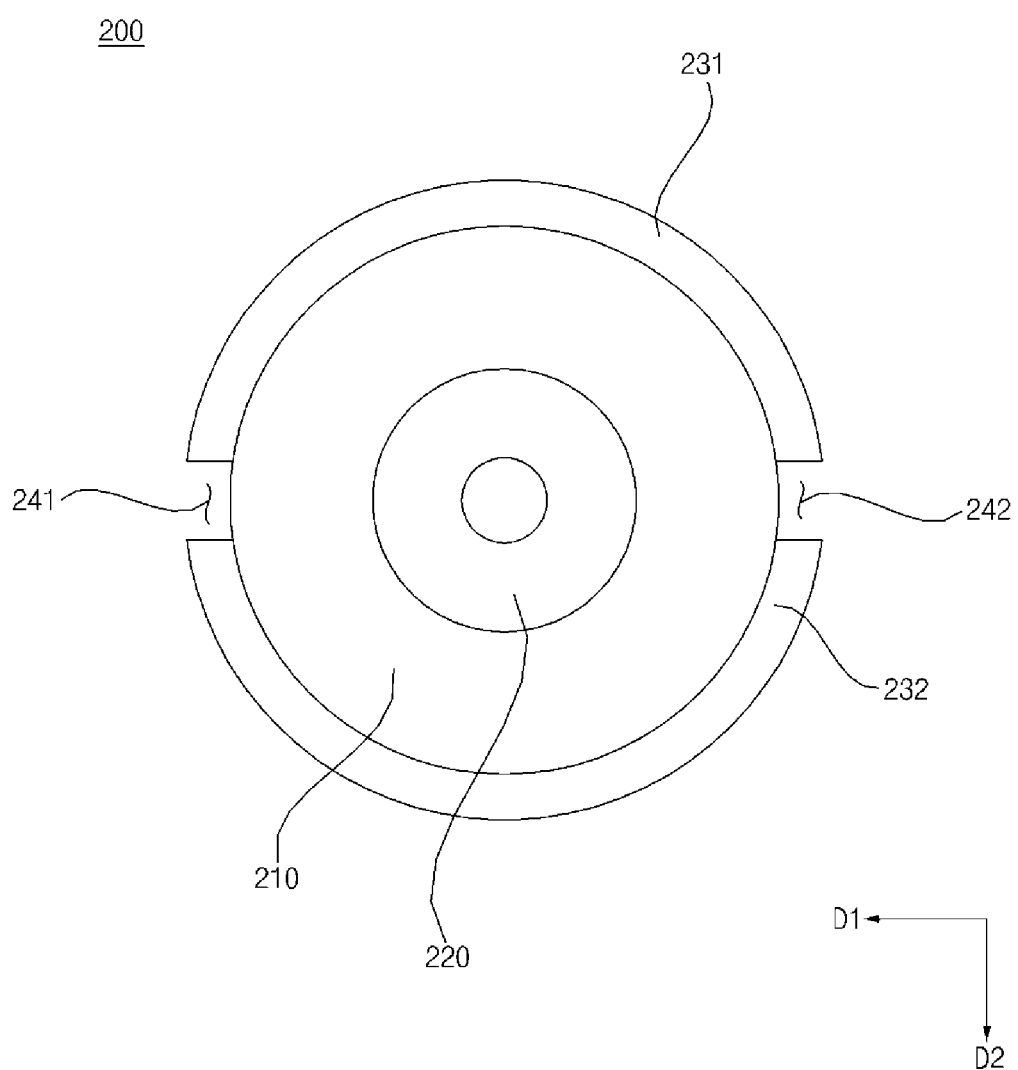
FIG. 2 is a plane view of a shield member according to an embodiment of the present disclosure.

FIG. 2 is a plane view of a shield member of the FIG. 1A.

Referring to FIG. 2, the shield member 200 may include a receiving part 210 in which the coil structure 100 is disposed, an inner wall part 220 formed to be surrounded by the inner periphery of the coil structure 100 and/or a coil structure. It may include an outer wall part 230 formed to surround the outer periphery of the coil structure 100.

The interval between the inner wall part 220 and the outer wall part 230 may correspond to the size of the coil structure 100. The height of the inner wall part 220 and/or the outer wall part 230 may correspond to the thickness of the coil structure 100 in the D3 direction. For example, the height of the inner wall part 220 and/or the outer wall part 230 in the D3 direction may be greater than or equal to the thickness of the coil structure 100 in the D3 direction.

The outer wall part 230 may include a first outer wall 231 and a second outer wall 232 formed to be spaced apart from each other. When the coil structure 110 is disposed in the receiving part 210 between the inner wall part 220 and the outer wall part 230, the conductors 111, 112 may be positioned in the spaces 241, 242 between the first outer wall 231 and the second outer wall 232, respectively.

The shield member 200 may be composed of ferrite composed of class one elements or a combination of class two or more elements selected from the group consisting of cobalt (Co), iron (Fe), nickel (Ni), boron (B), silicon (Si), etc. For example, the shield member 200 may be formed of a soft magnetic material that is easy to demagnetize and has a low hysteresis loss.

Referring to FIGS. 1A and 1b, the housing 300 may be formed to surround the outer periphery of the shield member 200. For example, the shield member 200 may be disposed in an opening formed at the upper end of the housing 300 by being inserted in the opening. The structure of the housing 300 will be described with reference to FIG. 3 to FIG. 5.

Figure 3:
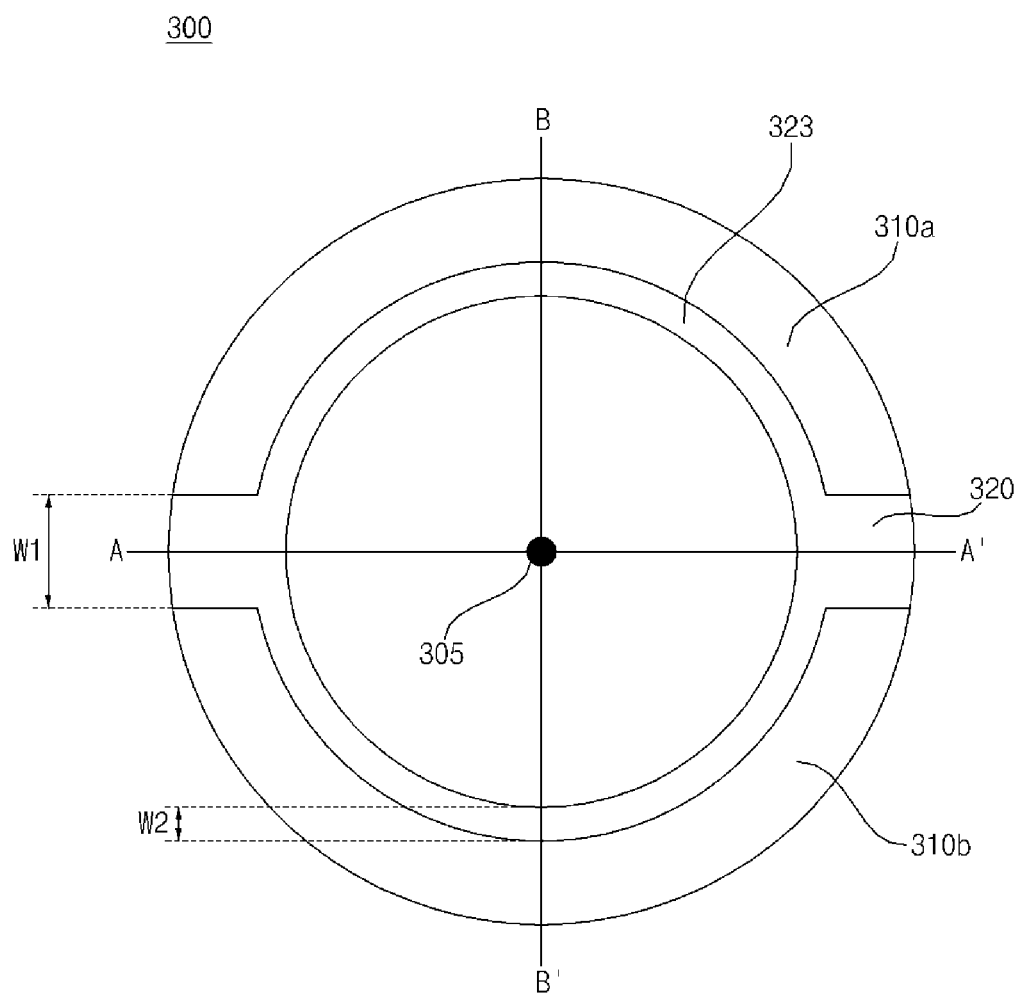
FIG. 3 is a plane view of the housing of FIG. 1A.
Figure 4A:
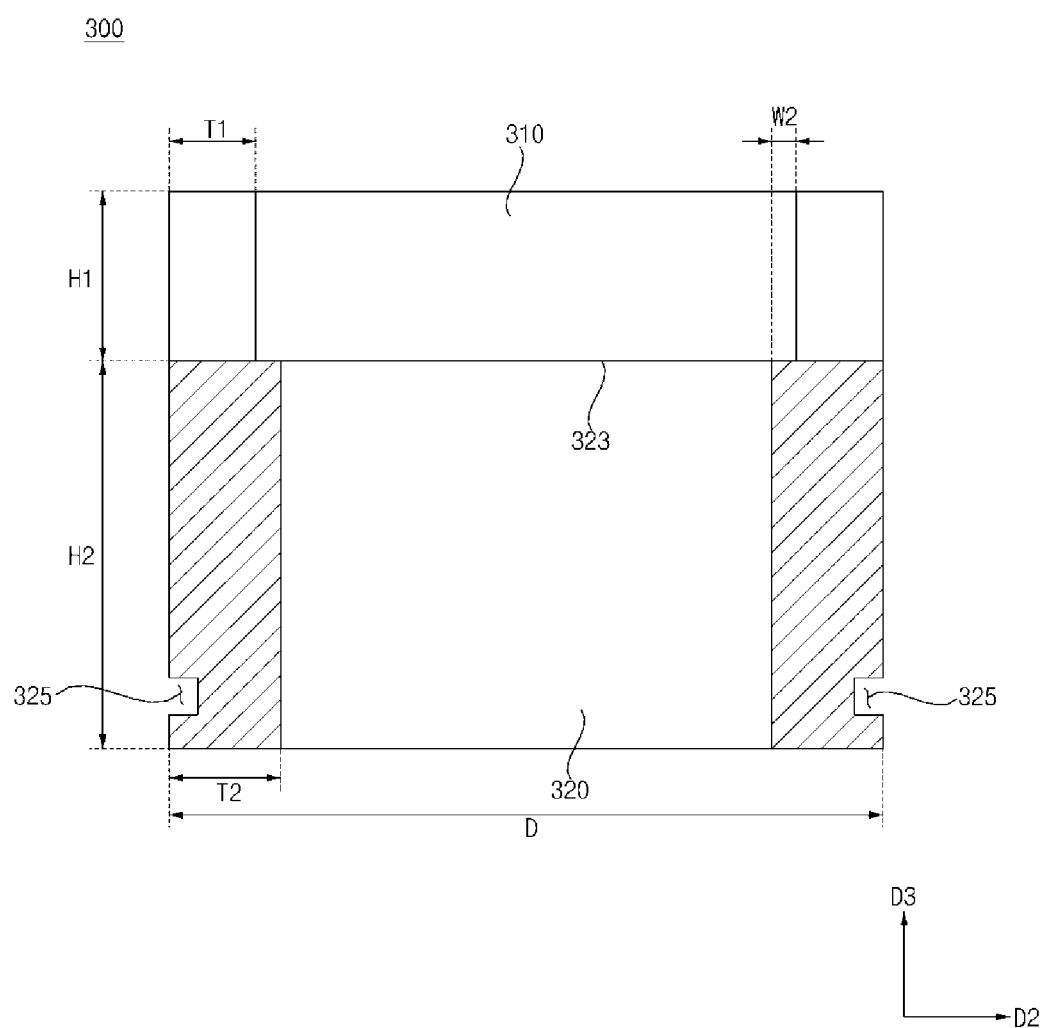
FIG. 4A is a side cross-sectional view of the housing for A-A' in FIG. 3.
Figure 4B:
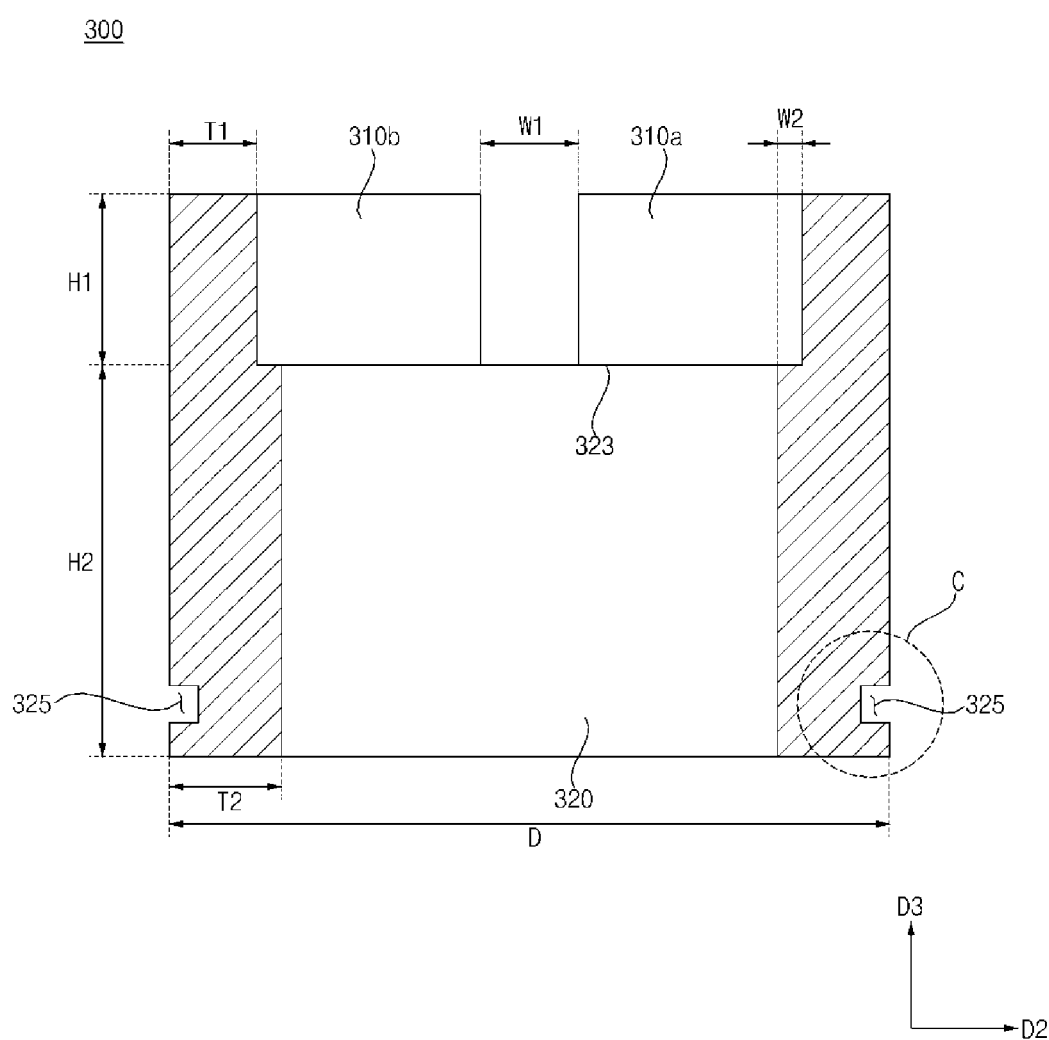
FIG. 4B is a side cross-sectional view of the housing for B-B' in FIG. 3.

FIG. 3 is a plane view of the housing of FIG. 1A. FIG. 4A is a side cross-sectional view of the housing 300 for A-A' in FIG. 3. FIG. 4B is a side cross-sectional view of the housing 300 for B-B' in FIG. 3.

Referring to FIG. 3 to FIG. 4B, the housing 300 may include an upper side wall part 310 and a lower side wall part 320 formed to be extended from the upper side wall part 310.

The housing may be formed in a cylindrical shape with at least one opened end and on which a central axis passing the inner center of the housing is vertically placed and at least one end opened and. In this figure, the shape of the housing 300 is illustrated as having a cylindrical shape, but the present disclosure is not limited thereto. The housing 300 may have a polygonal shape such as a quadrangle in cross section perpendicular to the central axis 305.

The upper side wall part 310 may form an outer periphery of the shield member 200. For example, the diameter of the inner circumferential surface of the upper side wall part 310 may correspond to the diameter of the outer circumferential surface of the shield member 200.

The upper side wall part 310 may include a first side wall 310a and a second side wall 310b formed to be spaced apart from each other. A separation distance W1 between the first side wall 310a and the second side wall 310b may correspond to a width of the spaces 241, 242 between the first outer wall 231 and the second outer wall 232 of the shield member 200. For example, the separation distance W1 between the first side wall 310a and the second side wall 310b may be equal to the width of the spaces 241, 242 between the first outer wall 231 and the second outer wall 232.

The height H1 of the upper side wall part 310 in the D3 direction may correspond to the height of the inner wall part 220 and/or the outer wall part 230 of the shield member 200. For example, the height H1 of the upper side wall part 310 in the D3 direction may be equal to the height of the inner wall part 220 and/or the outer wall part 230 of the shield member 200.

The inner circumferential surface of the lower side wall part 320 may be formed to be protruded from the inner circumferential surface of the upper side wall part 310 toward the inside of the housing 300, in the D2 direction, by a predetermined width W2. That is, a thickness T2 of the lower side wall part 320 in the D2 direction may be greater than a thickness T1 of the upper side wall part 310 in the D2 direction.

Meanwhile, a top surface 323 of the lower side wall part 320 may be formed, between the inner circumferential surface of the upper side wall part 310 and the inner circumferential surface of the lower side wall part 320, due to the difference between the thickness T1 of the upper side wall part 310 and the thickness T2 of the lower side wall part 320. In this case, when the shield member 200 is inserted through the opening formed at the top of the housing 300, that is, the opening formed by the upper side wall part 310, the shield member 200 may be disposed on the top surface 323 of the lower side wall part 320. The shield member 200 is supported by the top surface 323 of the lower side wall part 320.

Figure 5:
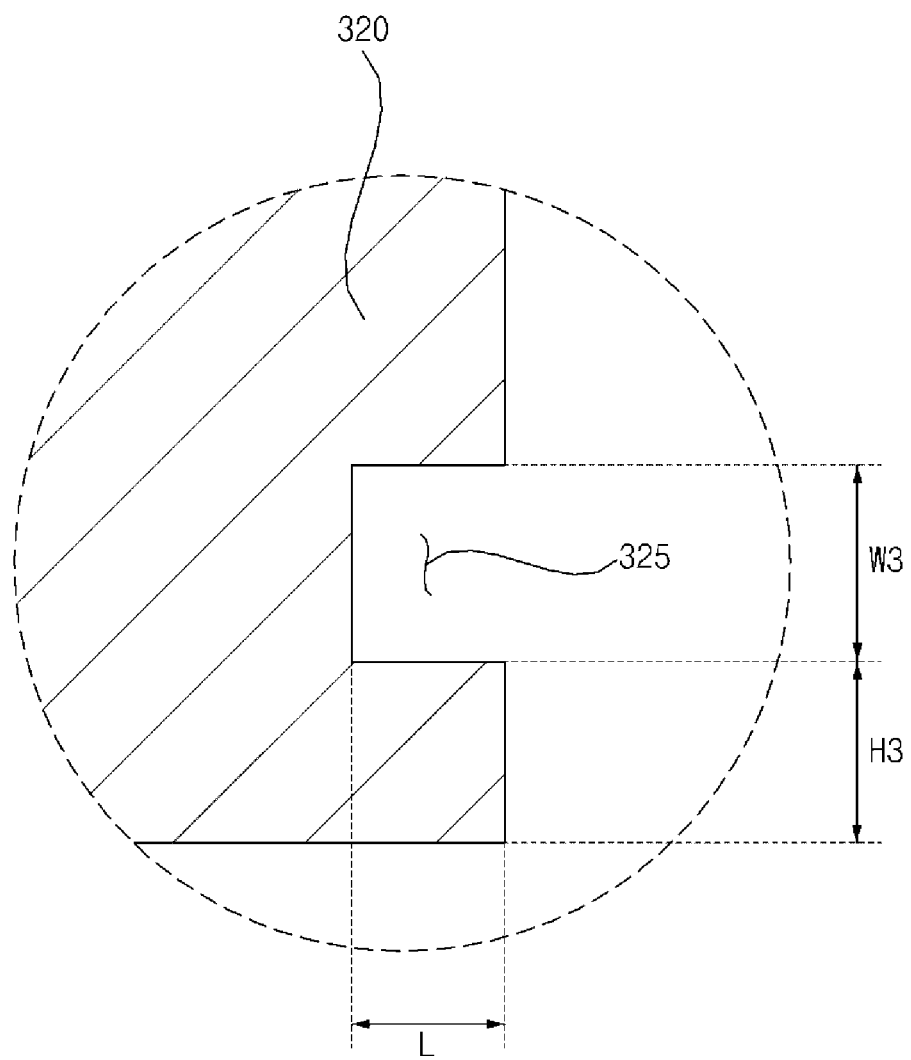
FIG. 5 is an enlarged view of one region of the housing of FIG. 4B.

The outer circumferential surface of the lower side wall part 320 may include a depressed region 325 formed by being depressed into the housing 300 by a predetermined depth. For example, the depressed region 325 may be formed along the periphery of the outer circumferential surface of the lower side wall part 320. Referring to FIG. 5, the depressed region 325 formed on the outer circumferential surface of the lower side wall part 320 will be described.

FIG. 5 is an enlarged view of one region of the housing of FIG. 4B.

Referring to FIG. 5, the depressed area 325 may be formed by being depressed more into the housing 300 by a predetermined depth L than the region around the outer circumferential surface. In this case, in consideration of the fact that the durability of the housing 300 decreases as the predetermined depth L increases, the predetermined depth L forming the depressed region 325, corresponding to the thickness T2 of the lower side wall part 320, may be less than a half of the thickness of the lower side wall part 320. For example, the depressed region 325 may be formed by being depressed by 15% of the thickness of the lower side wall part 320 or less. More preferably, the depressed region 325 may be 5% to 15% of the thickness of the lower side wall part 320.

Meanwhile, the depressed region 325 may be formed at a position spaced apart from the lower end of the housing 300 by a predetermined height H3 or more. In this case, in consideration of the fact that the durability of the housing 300 decreases as the predetermined height H3 is smaller, the predetermined height H3 at which the depressed region 325 is formed may be the width W3 of the depressed region 325 or more.

Figure 6:
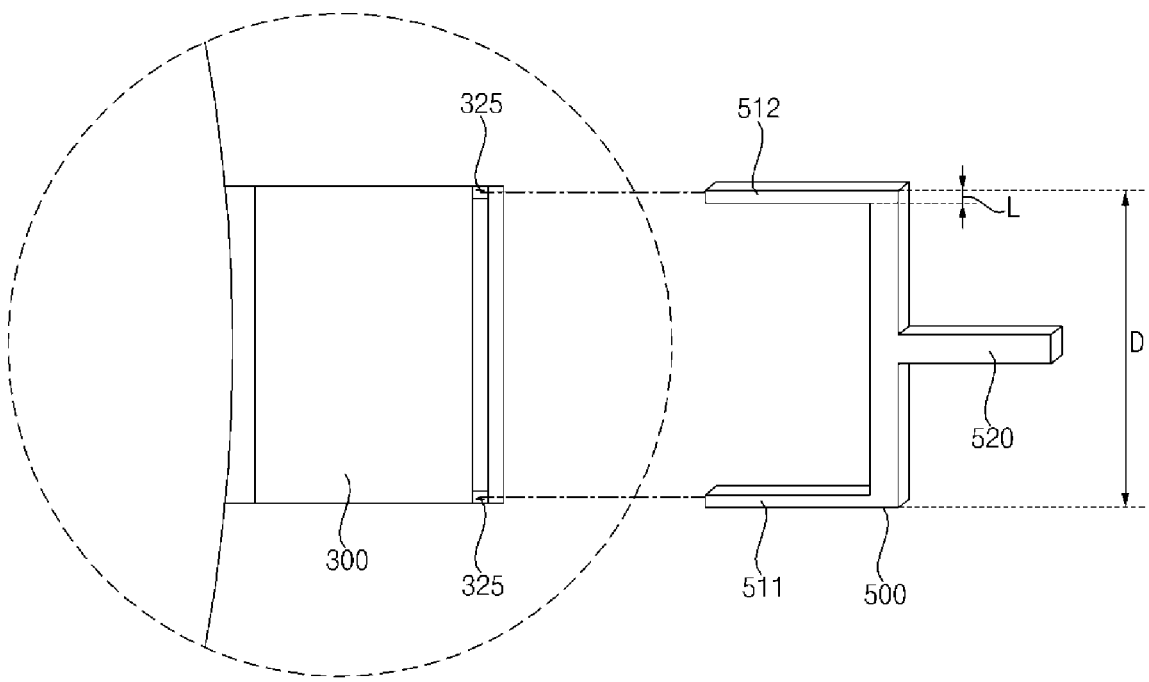
FIG. 6 is a drawing showing an example of a fastening instrument responsive to the depressed area of the housing according to an embodiment of the present disclosure.

FIG. 6 is a drawing showing an example of a fastening instrument corresponding to the depressed area of the housing according to one embodiment of the present disclosure.

Referring to FIG. 6, the fastening instrument 500 may be formed in a shape corresponding to the depressed region 325 formed on the outer circumferential surface of the housing 300. For example, the fastening instrument 500 may include a plurality of insertion parts 511, 512 inserted into the depressed region 325 and a support part 520 supporting a plurality of insertion parts 511, 512.

The entire width of the fastening instrument 500 may correspond to the diameter D of the outer circumferential surface of the lower side wall part 320 of the housing 300. And the width of each of the plurality of insertion parts 511, 512 may correspond to the predetermined depth L at which the depressed region 325 is formed.

After the displacement sensor 10 is mounted in the product, the user may insert a plurality of insertion parts 511, 512 of the fastening instrument 500 into the depressed area 325, and the position of the displacement sensor 10 in the product may be adjusted by moving the support part 520 to the left or right while the plurality of insertion part 511, 512 is inserted into the depressed region 325.

Figure 7A:
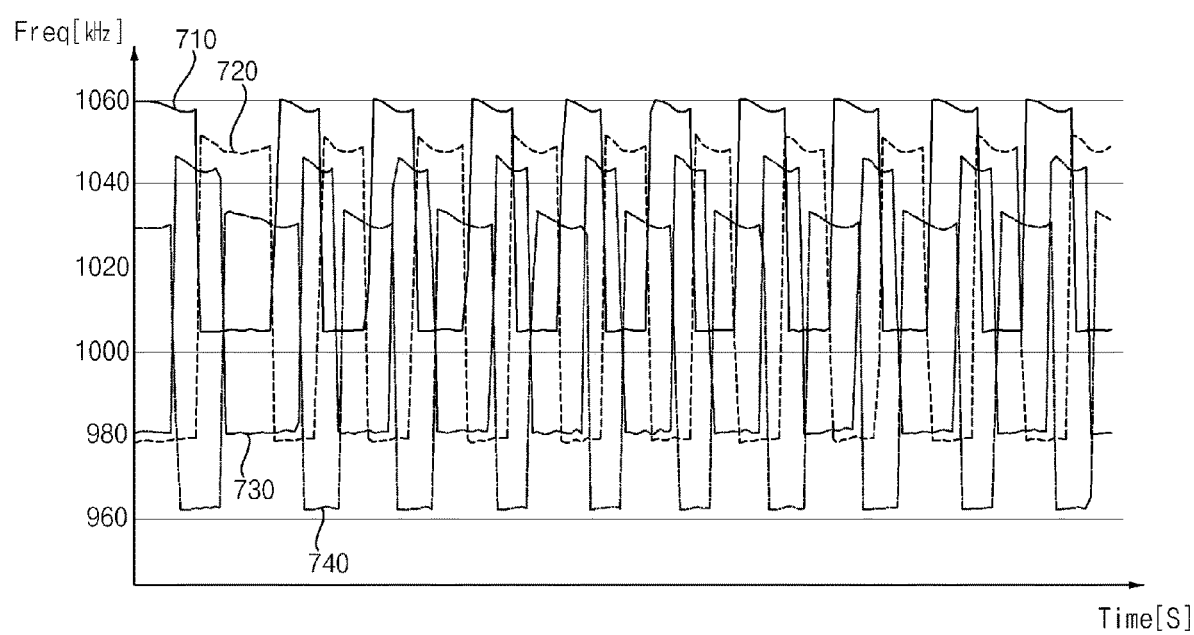
FIG. 7A and FIG. 7B are drawings referenced for explanation of the change of dispersion of a sensed value according to a position adjustment of a displacement sensor according to an embodiment of the present disclosure.
Figure 7B:
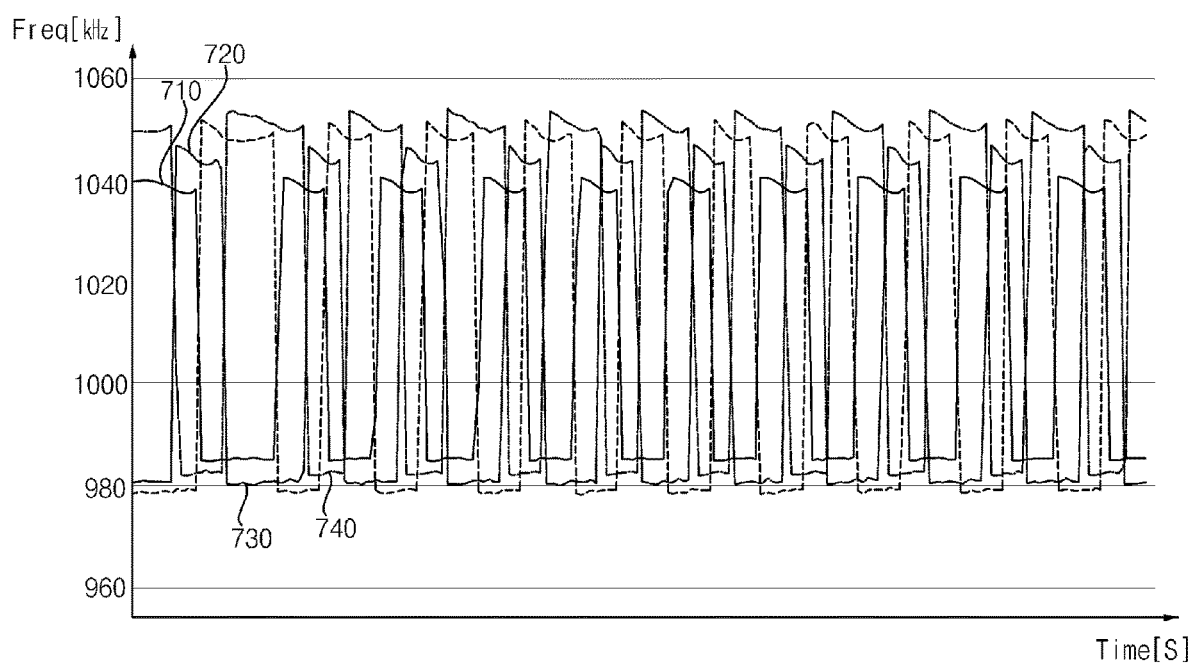

FIG. 7A and FIG. 7B are drawings referenced for explanation of the change of dispersion of a sensed value according to a position adjustment of a displacement sensor according to an embodiment of the present disclosure.

Referring to FIG. 7A, the degree of dispersion of the sensed value by the four displacement sensors 10 disposed in the product is about 100 kHz.

On the other hand, referring to FIG. 7B, when the positions of the four displacement sensors 10 disposed in the product are adjusted by using the fastening instrument 500, the degree of dispersion of the sensed value by the four displacement sensors 10 is about 70 kHz.

As described above, according to various embodiments of the present disclosure, by using the depressed region 325 formed on the outer circumferential surface of the housing 300, the position of the gap sensor 10 disposed in the product may be finely adjusted and the dispersion of the sensed value of the gap sensor 10 may be reduced and the accuracy of control based on the sensed value may be increased.

Figure 8:
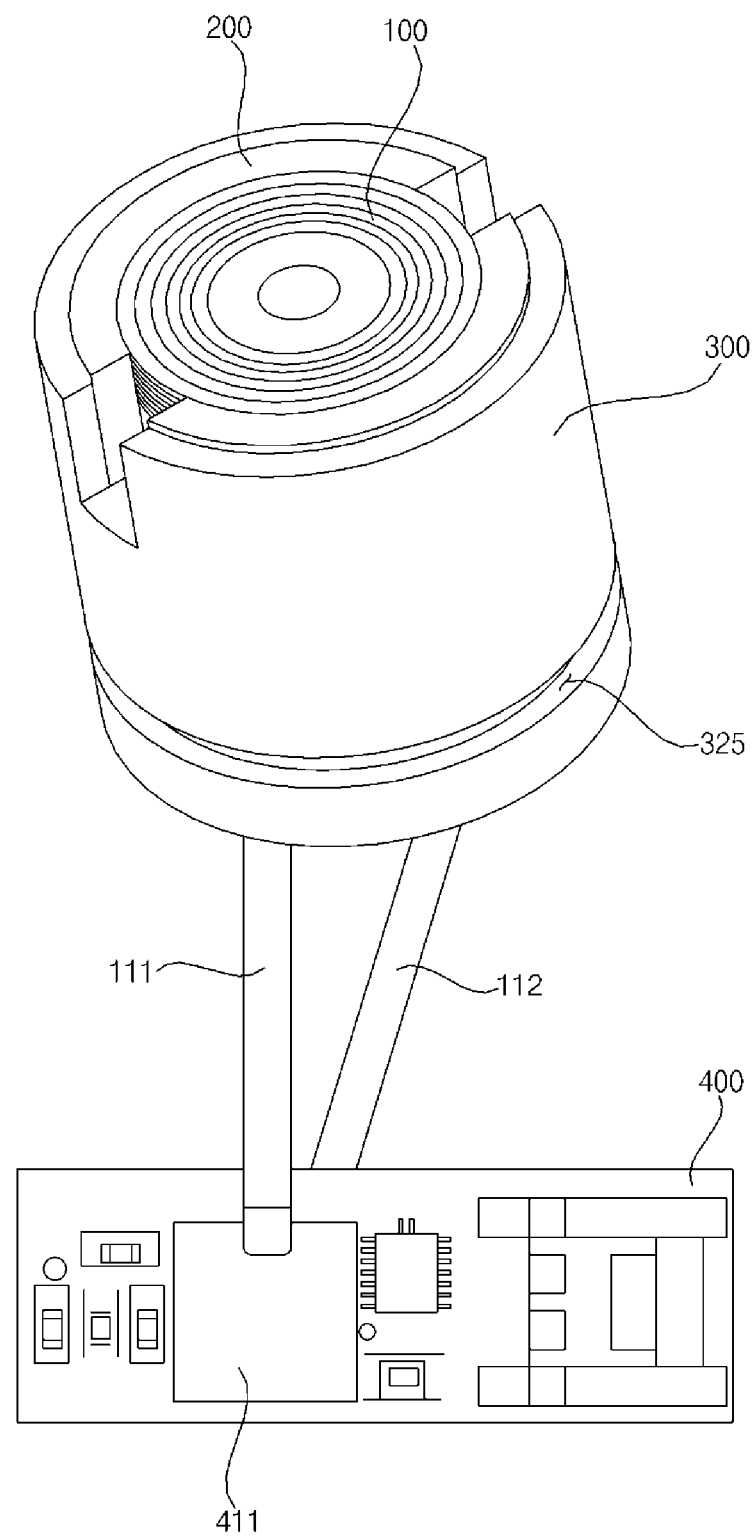
FIG. 8 is a perspective view in a state in which the components included in the displacement sensor according to an embodiment of the present disclosure are combined.

FIG. 8 is a perspective view in a state in which the components included in the displacement sensor according to an embodiment of the present disclosure are combined.

Referring to FIG. 8, the connectors 411, 412 may be connected to the control circuit 400 through the conductors 111, 112 exposed to the outside of the lower end of the housing 300. In this case, the control circuit 400 may include a connector terminal (not shown) for physical coupling with the connectors 411 and 412.

The control circuit 400 may supply current to the coil structure 100 through the connectors 411, 412 and the conductors 111, 112 and detect a change in impedance of the coil structure 100. In this case, the control circuit 400 may transmit an electrical signal corresponding to the impedance of the coil structure 100 to an external element.

FIG. 9 to FIG. 12 are drawings referenced for the explanation of the coil structure of FIG. 1A.

Figure 9:
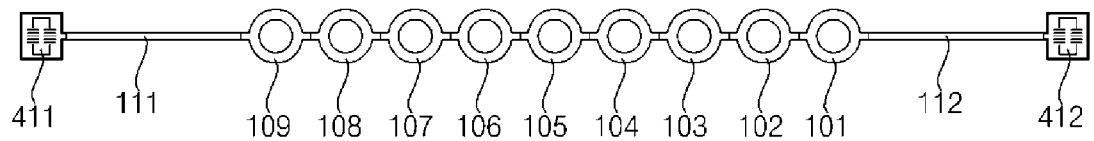
FIG. 9 to FIG. 12 are drawings referenced for the explanation of the coil structure of FIG. 1A.

Referring to FIG. 9, a plurality of coils 101 to 109 constituting the coil structure 100 may be formed on the FPCB along the longitudinal direction, respectively. Here, the FPCB referred to as a flexible printed circuit board means a printed circuit board having high heat resistance, bending resistance, and chemical resistance, and having flexibility by using a flexible material (e.g., polyimide) as a main material.

Each of the plurality of coils 101 to 109 may be partially formed on the first layer of the FPCB. A part of a first coil among the plurality of coils may be formed in a first layer of the FPCB and a remaining part of the first coil may be formed in the second layer of the FPCB. Here, the first layer and the second layer may mean a conductive layer of the FPCB in which the conductor such as copper is printed in a copper foil pattern.

In this regard, it will be described with reference to FIGS. 10A and 10b.

Figure 10A:
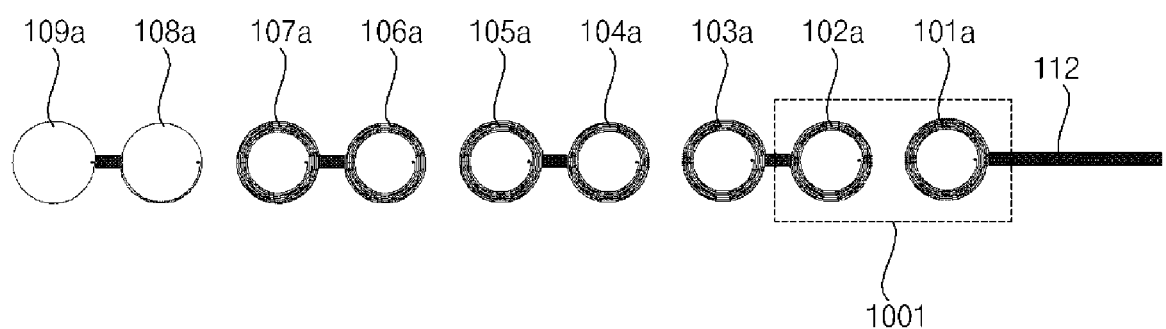

FIG. 10A is a drawing showing the part of a plurality of coils 101 to 109 formed on the first layer of the FPCB. FIG. 10B is a drawing showing the part of the plurality of coils 101 to 109 formed on the second layer of the FPCB.

Figure 10B:
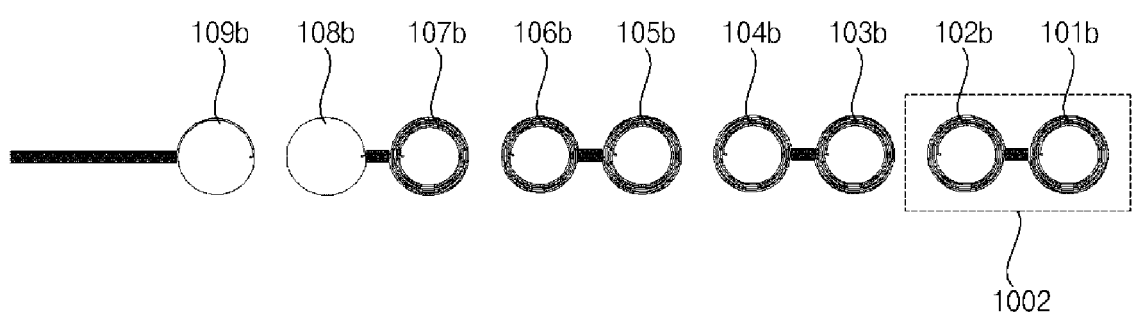

Referring to FIGS. 10A and 10b, some parts 101a to 109a of the plurality of coils may be formed in a coil-shaped pattern on the first layer of the FPCB, and other parts 101b to 109b of the plurality of coils may be formed in a coil-shaped pattern on the second layer of the FPCB.

In this case, the first conductor 111 may be formed in a copper foil pattern on the second layer of the FPCB and may be connected to the part 109b of the ninth coil. In addition, the second conductor 112 may be formed in a copper foil pattern on the first layer of the FPCB and may be connected to the part 101a of the first coil.

The number of windings of each of the plurality of coils 101 to 109 may depend on the impedance of the coil structure 100. For example, the parts 101a to 107a of the first to seventh coils formed on the first layer of the FPCB may be wound seven times, and the parts 108a and 109a of the eighth and ninth coils may be wound 1.5 times. In this case, the diameter and the winding interval of each of the plurality of coils 101 to 109 may be the same.

Meanwhile, some parts 101a to 109a of the plurality of coils formed on the first layer of the FPCB and the remaining parts 101b to 109b of the plurality of coils formed on the second layer of the FPCB are electrically connected to each other through a via hole. In this regard, it will be described with reference to FIG. 11.

Figure 11:
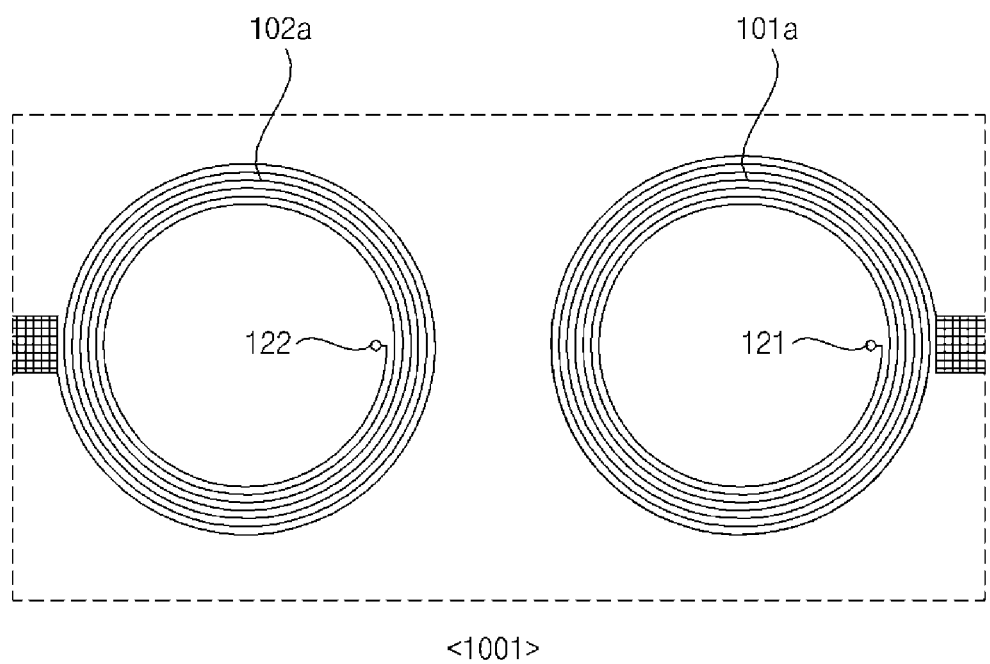
Figure 11:
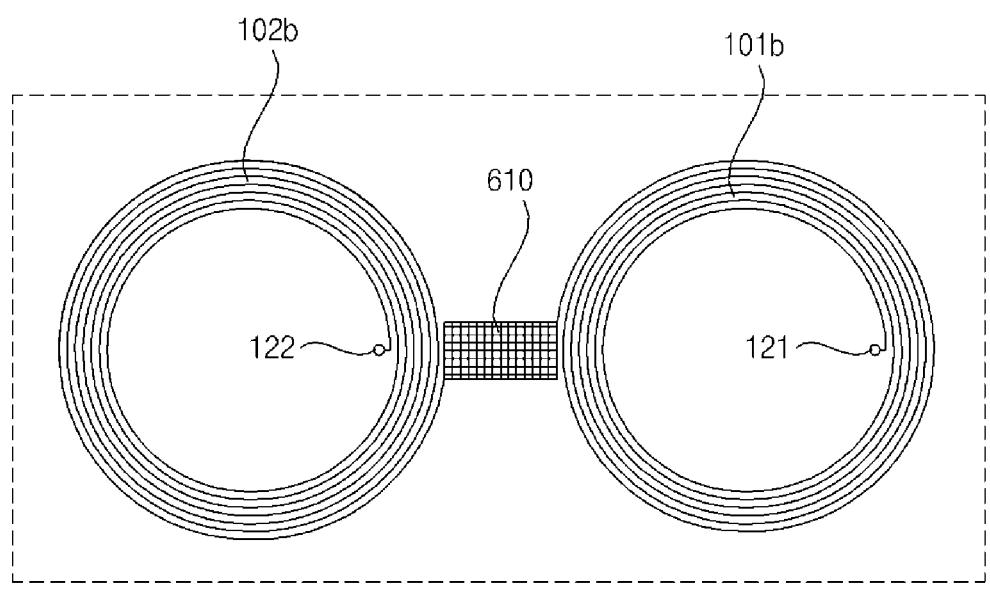

FIG. 11 is an enlarged view of a region 1001 of FIG. 10A and a region 1002 of FIG. 5b.

Referring to FIG. 11, the part 101a of the first coil formed on the first layer of the FPCB may be formed in a pattern of a spiral structure extending toward the center while rotating in a counterclockwise direction.

In this case, one end of the part 101a of the first coil may be electrically connected to one end of the part 101b of the first coil formed in the second layer of the FPCB through the via hole 121. The parts 101b of the first coil formed on the second layer of the FPCB may be formed in a pattern of a spiral structure extending from the center while rotating in a clockwise direction.

Meanwhile, the other end of the part 101b of the first coil formed on the second layer of the FPCB may be electrically connected with the one end of the part 102b of the second coil formed on the second layer of the FPCB through the connection conductor 1110 formed in pattern on the second layer of the FPCB.

The part 102b of the second coil formed on the second layer of the FPCB may be formed in a pattern of a spiral structure extending toward the center while rotating clockwise from the one end connected to the connection conductor 1110.

In this case, the other end of the part 102b of the second coil formed on the second layer of the FPCB may be electrically connected to one end of the part 102a of the second coil formed in the first layer of the FPCB through the via hole 122. The part 102a of the second coil formed on the first layer of the FPCB may be formed in a pattern of a spiral structure extending from the center while rotating in a clockwise direction.

Referring back to FIGS. 10A and 10b, when current is supplied to the second conductor 112, the current may flow through The part 101a of the first coil formed on the first layer of the FPCB, Part 101b of the first coil formed on the second layer of the FPCB, The part 102b of the second coil formed on the second layer of the FPCB, The part 102a of the second coil formed on the first layer of the FPCB, Part 103a of the third coil formed on the first layer of the FPCB, Part 103b of the third coil formed on the second layer of the FPCB, The part 104b of the fourth coil formed on the second layer of the FPCB, The part 104a of the fourth coil formed on the first layer of the FPCB, The part 105a of the fifth coil formed on the first layer of the FPCB, The part 105b of the fifth coil formed on the second layer of the FPCB, The part 106b of the sixth coil formed on the second layer of the FPCB, The part 106a of the sixth coil formed on the first layer of the FPCB, The part 107a of the seventh coil formed on the first layer of the FPCB, The part 107b of the seventh coil formed on the second layer of the FPCB, The part 108b of the eighth coil formed on the second layer of the FPCB, The part 108a of the eighth coil formed on the first layer of the FPCB, The part 109a of the ninth coil formed on the first layer of the FPCB and the part 109b of the ninth coil formed on the second layer of the FPCB to the first conductor 111.

Meanwhile, the plurality of coils 101 to 109 may form the coil structure 100 by being overlapped. In this regard, it will be described with reference to FIG. 12.

Figure 12:
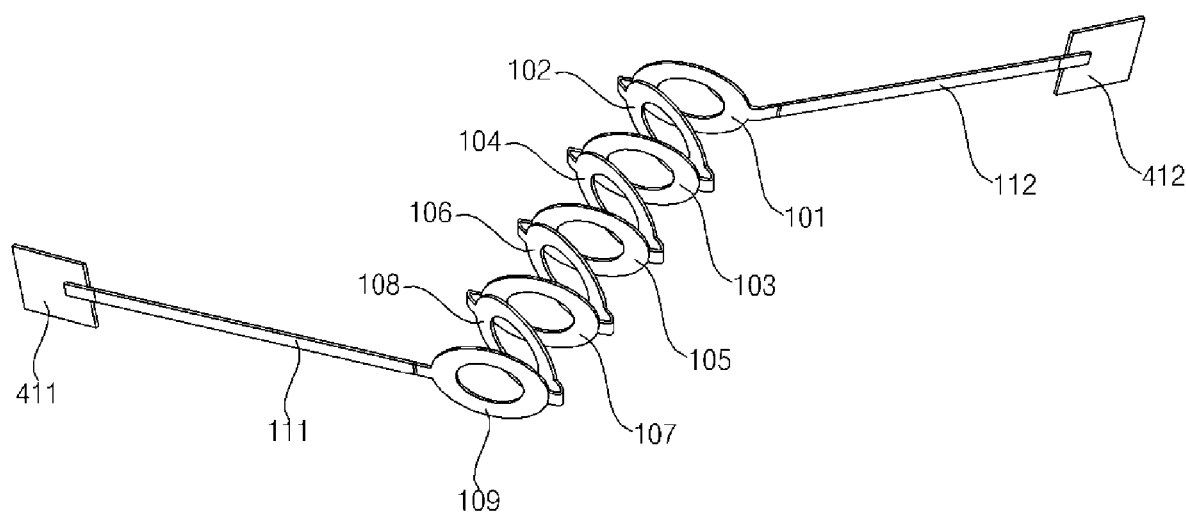

Referring to FIG. 12, the first coil 101 to the ninth coil 109 may be sequentially overlapped. In this case, one surface of the first coil 101 and one surface of the second coil 102 may contact each other. The other surface of the second coil 102 and the other surface of the third coil 103 may contact each other. The first coil 101 to the ninth coil 109 may be sequentially overlapped.

That is, as the part 101b of the first coil formed on the second layer of the FPCB and the part 102b of the second coil formed on the second layer of the FPCB face each other and the part 102a of the second coil formed on the first layer of the FPCB and the part 103a of the third coil formed on the first layer of the FPCB face each other, the first coil 101 to the ninth coil 109 may be sequentially overlapped.

In this case, the plurality of coils 101 to 109 may be bonded to each other to be fixed. For example, an adhesive may be attached to each surface of the plurality of coils 101 to 109. As the first coil 101 to the ninth coil 109 are sequentially overlapped, the plurality of coils 101 to 109 may be adhered and fixed to each other.

As described above, according to various embodiments of the present disclosure, by forming the plurality of coils 101 to 109 on the FPCB with the same size and thickness, and by forming the coil structure 100 in which the plurality of coils 101 to 109 is overlapped in folding the FPCB, each displacement sensor may include the coil structure 100 with constant impedance.

Also, according to various embodiments of the present disclosure, as the coil (e.g., the first coil 101) disposed at the top end of the coil structure 100 and the coil (e.g., the ninth coil 109) disposed at the bottom end are connected to the connectors 411, 412, and as the connectors 411, 412 are physically connected to the control circuit 400, the coil structure and the control circuit 400 may be more rigidly connected.

Also, according to various embodiments of the present disclosure, as the coil structure 100 and the connectors 411, 412 are electrically connected by the conductors 111, 112, the coil structure 100 may be disposed apart from the control circuit 400 by the predetermined separation distance and the space limitation for disposition of the displacement sensor 10 in the product may be reduced.

Also, according to various embodiments of the present disclosure, by using the depressed region formed on the housing 300, the position of the gap sensor 10 disposed in the product may be finely adjusted and the dispersion of the sensed value of the gap sensor may be reduced and the accuracy of control based on the sensed value may be increased.

The effects of the present disclosure are not limited to the effects mentioned above, and other effects that are not mentioned will be clearly understood by those who skilled in the art from the description of the claims.

The referenced drawings are only for easy understanding of the embodiments disclosed in the present specification and should be understood to include and all changes, equivalents or substitutes included in the technical idea and scope of the present disclosure. And the technical idea disclosed in the present specification is not limited by the referenced drawings.

In the above, preferred embodiments of the present disclosure have been illustrated and described, but the present disclosure is not limited to the specific embodiments described above. The present disclosure can be implemented in various modifications by those who skilled in the art to which the present disclosure belongs without getting out of the point of the present disclosure in the claims. These modified implementations should not be individually understood from the technical idea or perspective of the present disclosure.

What is claimed is:

1. A displacement sensor comprising:
   a coil structure provided as a wound coil;
   a shield member formed to surround an outer periphery of the coil structure, the shield member having a height in a first direction; and
   a housing,
   wherein the housing comprises:
      an upper side wall part surrounding an outer periphery of the shield member, the upper side wall part having a height in the first direction or a second direction parallel to the first direction; and
      a lower side wall part formed to extend from the upper side wall part in the first direction or the second direction,
   wherein an inner circumferential surface of the lower side wall part is protruded in a third direction toward the inside of the housing more than an inner circumferential surface of the upper side wall part, the third direction being perpendicular to the first direction, and
   wherein an outer circumferential surface of the lower side wall part comprises a depressed region formed to be depressed in the third direction or a fourth direction perpendicular to the first direction into the inside of the housing by a predetermined depth.

2. The displacement sensor according to claim 1,
   wherein the shield member is inserted into an opening formed on a top of the housing by the upper side wall part and is disposed at a top surface of the lower side wall part formed by a difference in thickness, in the third direction or the fourth direction, of the upper side wall part and the lower side wall part.

3. The displacement sensor according to claim 2,
   wherein the depressed region is formed along a periphery of the outer circumferential surface of the lower side wall part.

4. The displacement sensor according to claim 3,
   wherein the predetermined depth in the third direction or the fourth direction is less than the thickness of the lower side wall part in the third direction or the fourth direction.

5. The displacement sensor according to claim 4,
   wherein the predetermined depth is 15% of the thickness of the lower side wall part or less.

6. The displacement sensor according to claim 5,
   wherein the depressed region is formed on a position spaced apart from a bottom of the housing by a predetermined height or more in the first direction or the second direction.

7. The displacement sensor according to claim 6,
   wherein the predetermined height in the first direction or the second direction is a width of the depressed region or more.

8. The displacement sensor according to claim 7,
   wherein the housing has at least one end opened and has a cylindrical shape on which a central axis passing an inner center of the housing is vertically placed.

9. The displacement sensor according to claim 1,
   wherein the coil structure is formed to overlap a plurality of coils electrically connected,
   wherein the plurality of coils are formed along a longitudinal direction and on a FPCB (Flexible Printed Circuits Board), respectively,
   wherein a part of a first coil among the plurality of coils is formed in a first layer of the FPCB and a remaining part of the first coil is formed in a second layer of the FPCB electrically connected with the first layer through a via-hole.

10. The displacement sensor according to claim 9,
    wherein a part of a second coil among the plurality of coils adjacent to the first coil is formed in the first layer and a remaining part of the second coil is formed in the second layer,
    wherein the part of the first coil formed in the second layer and the part of the second coil formed in the second layer are connected through a connection conductor formed in the second layer, wherein the plurality of coils is overlapped so that the part of the first coil formed in the second layer and the part of the second coil formed in the second layer face each other.

11. A displacement sensor comprising:

a coil structure consisting of wound coil;

a shield member formed to surround an outer periphery of the coil structure; and a housing having a top end opening and a lower end, and a height is in a first direction between the top end opening and the lower end, wherein the housing comprising:

an upper side wall part surrounding an outer periphery of the shield member;

a lower side wall part formed to extend from the upper side wall part in the first direction or a second direction parallel to the first direction, and wherein an inner circumferential surface of the lower side wall part is protruded in a third direction toward the inside of the housing more than an inner circumferential surface of the upper side wall part, the third direction being perpendicular to the first direction, and the third direction being perpendicular to the second direction.

12. The displacement sensor according to claim 11, wherein the shield member is supported by a top surface of the lower side wall part.

13. The displacement sensor according to claim 11, wherein the outer circumferential surface of the lower side wall part comprises a depressed region depressed in a fourth direction into the inside of the housing, wherein the depressed region is formed along the outer circumferential surface of the lower side wall part.

14. The displacement sensor according to claim 13, wherein a depth of the depressed region in the fourth direction is under a half of a thickness of the lower side wall part.

15. The displacement sensor according to claim 14, wherein the depth of the depressed region is 5% to 15% of the thickness of the lower side wall part.

16. The displacement sensor according to claim 13, wherein the depressed region is formed in a position spaced apart from the lower end of the housing in the first direction or the second direction by a predetermined height or more.

17. The displacement sensor according to claim 16, wherein the predetermined height is a width of the depressed region or more.

18. The displacement sensor according to claim 11, wherein the housing has a cylindrical shape with at least one end opened.

19. The displacement sensor according to claim 11, wherein the coil structure is formed of a plurality of coils overlapped and electrically connected, wherein the plurality of coils are formed along a longitudinal direction and on a FPCB (Flexible Printed Circuits Board), respectively, wherein a part of a first coil among the plurality of coils is formed in a first layer of the FPCB and a remaining part of the first coil is formed in a second layer of the FPCB electrically connected with the first layer through a via-hole.

20. The displacement sensor according to claim 19, wherein a part of a second coil among the plurality of coils adjacent to the first coil is formed in the first layer and a remaining part of the second coil is formed in the second layer, wherein the part of the first coil formed in the second layer and the part of the second coil formed in the second layer are connected through a connection conductor formed in the second layer, wherein the plurality of coils is overlapped so that the part of the first coil formed in the second layer and the part of the second coil formed in the second layer face each other.

* * * * *